UNITED STATES PATENT OFFICE.

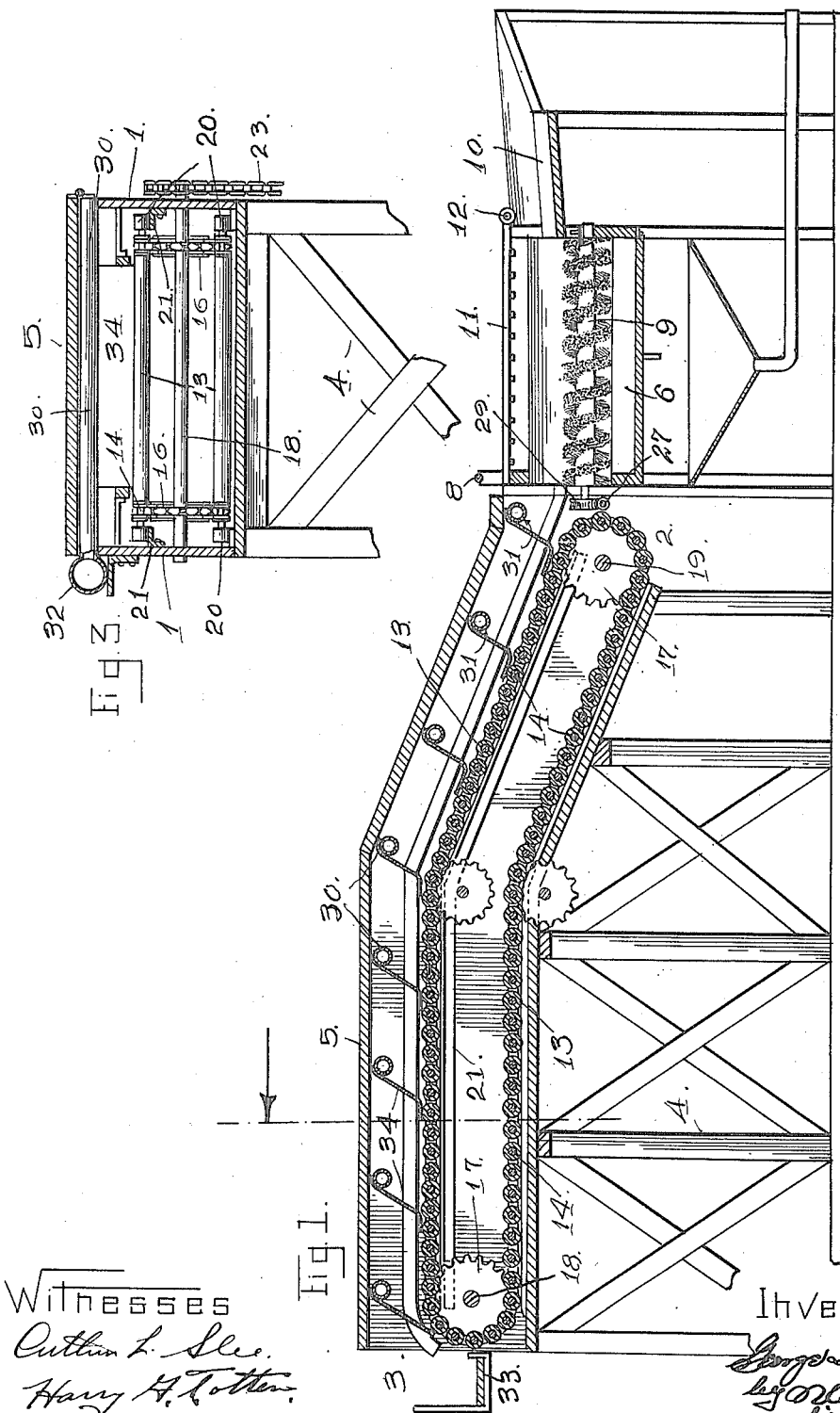

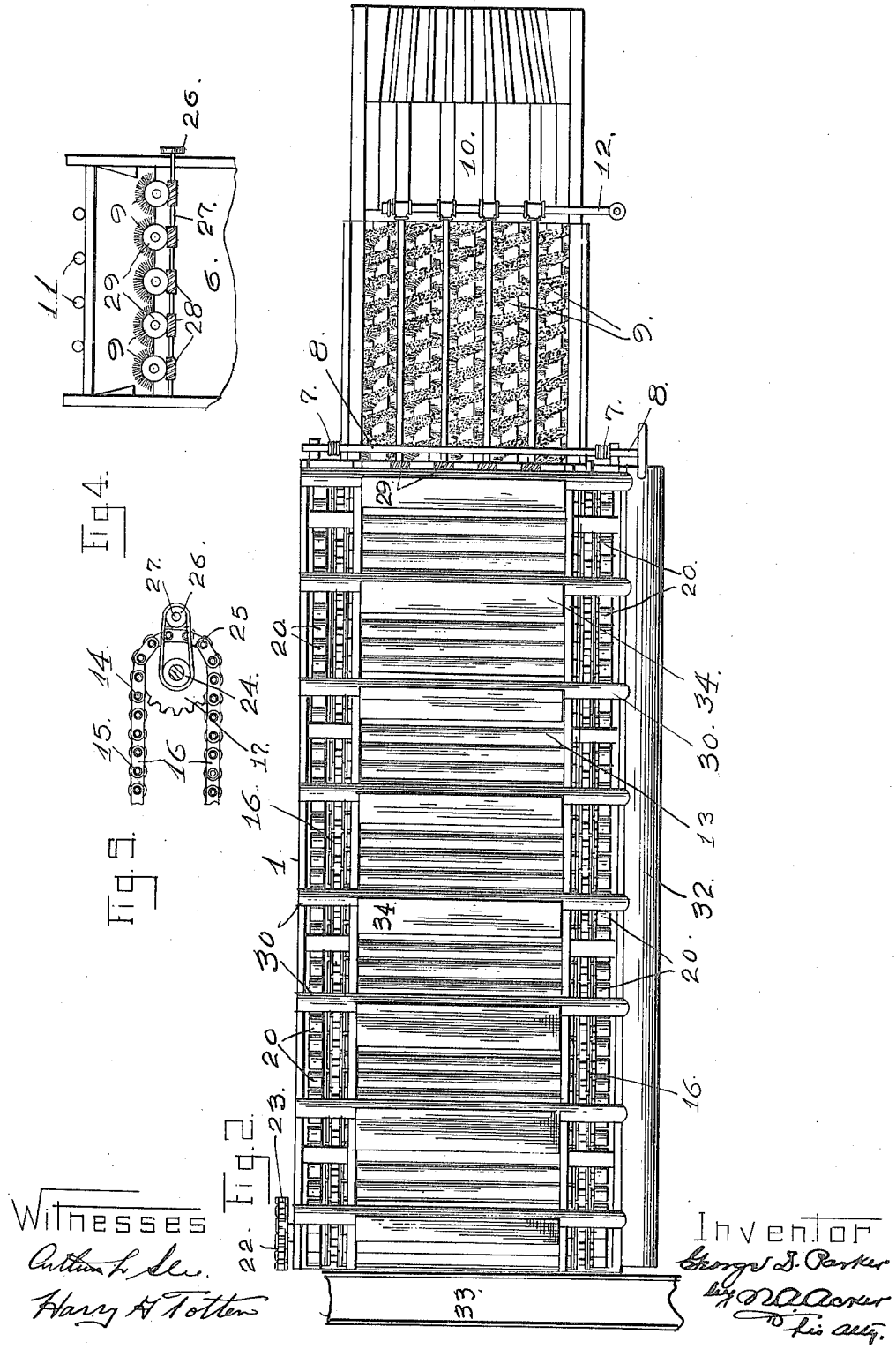

GEORGE D. PARKER, OF RIVERSIDE, CALIFORNIA.

APPARATUS FOR DRYING FRUIT.

1,158,388.  Specification of Letters Patent.   Patented Oct. 26, 1915.

Application filed June 1, 1912. Serial No. 700,914.

*To all whom it may concern:*

Be it known that I, GEORGE D. PARKER, a citizen of the United States, residing at Riverside, in the county of Riverside and State of California, have invented certain new and useful Improvements in Apparatus for Drying Fruit, of which the following is a specification.

The hereinafter described invention relates to an improved fruit washing, conveying and drying apparatus, but more particularly to the drying of fruit, preferably oranges, after the same have been subjected to a combined washing and brushing operation, wherein the foreign matter is removed from the skin thereof, and has for its principal object to provide a drier of the above character which will elevate the fruit from the washing apparatus, convey the same from the washing apparatus to a sorting table or the like, and rotate the fruit in the conveying and drying operation that all surfaces thereof will be presented to the drying medium.

Another object is to provide a drier for the drying of washed fruit whereby the fruit may be thoroughly washed, instead of dry brushed, and when presented for market will have a better appearance and command a higher price than the fruit prepared by the dry method.

Another and important object of the invention is to render automatic the operation of washing and drying fruit and simultaneously conveying the fruit from the washer to the sorting table, and by so doing, materially increasing the capacity of a fruit packing house and correspondingly reducing the cost of preparing the fruit for market.

The improved device comprises a washing means for washing and brushing the fruit, devices for feeding the fruit thereto, a conveyer associated with said washing means for receiving the washed fruit and conveying it to a sorting table, a housing for said conveyer, means extending within said housing for subjecting the fruit to an air blast while on said conveyer, and means associated with said conveyer for rotating the fruit while the same is being conveyed to present all surfaces thereof to the air blasts.

With the above mentioned and other objects in view, the invention consists in the construction and novel combination of parts, hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To comprehend the invention, reference should be had to the accompanying sheets of drawings illustrating a simply constructed apparatus for successively carrying out the invention, wherein—

Figure 1 is a longitudinal broken sectional view of my improved device, disclosing the washing apparatus with the rotating brushes and the water spray pipes associated therewith, one of the conveyer chains, the conveyer rolls associated therewith, the housing for the conveyer, the supporting structure for the housing, and the air blast distributing pipes for directing a blast of air upon the fruit as it is being conveyed and rotated by said rolls, the direction of rotation of the conveyer rolls and the fruit being shown by arrows and the operating means for the several parts of the device. Fig. 2 is a top plan view of Fig. 1, with the conveyer housing covers removed, disclosing the washing apparatus, the means for feeding the fruit thereto, the conveying chains, the conveyer rolls carried thereby, the endless tracks for supporting the rolls, the air blast pipes above said rolls, the air feed duct, and the endless conveyer at the discharge end of the drier for removing the fruit to a sorting table or the like. Fig. 3 is a cross sectional view of the drying mechanism, taken on line 3—3, Fig. 1, disclosing the housing, the tracks therein, the endless conveyer chains, the conveyer rolls, the manner of rotating the same and the manner of their attachment to the conveyer chains, the air blast pipe, and the air feed duct. Fig. 4 is a detail of the operating mechanism for the rotary brushes and the means for positioning the delivery end of the washing apparatus in proper relation to the conveyer rolls. Fig. 5 is a view in detail of the driving connection between the chains of the conveyer and the rotary buckets.

In the drawings, the reference numeral 1 designates a suitable housing preferably oblong in shape, open at its intake and discharge ends as at 2 and 3, supported by suitable uprights 4 and provided with a hinged cover 5, the housing carrying the drying and conveying mechanisms hereinafter described.

Positioned adjacent the intake end 2 of the housing, is a fruit washing apparatus of the well known type, the same consisting of a tank 6 pivotally mounted by the hinge 6' at its front end and having its rear end adjustable to a proper incline and in the proper relation to the intake 2, by the chains 7 and rotatable shaft mechanism.

Rotatably mounted in journals in the ends of the tank 6 are a plurality of parallel spaced downwardly inclined brushes 9, the brushes being raised or lowered with the adjustment of the tank 6; the brushes 9 are adapted to be rotated in a hereinafter described manner and adapted to brush the foreign matter from the skin of the fruit after it is fed onto said brushes from a downwardly inclined feed table 10. The fruit as it is subjected to the brushing operation is sprayed with water from suitable spray pipes 11 positioned above the brushes and connected to a suitable source of supply through a pipe 12, the water softening any foreign matter adhering to the fruit skin that it may be more easily removed by the action of the rotary brushes. The water used in spraying the fruit falls into the tank 6 from which it is drained through a suitable drain pipe.

The action of the downwardly inclined brushes 9 on the fruit will cause the same to pass the length of the brushes and over the rear end of the tank onto suitable parallel spaced revolving rolls 13, which extend transversely of the housing 1 and are provided at their ends with outwardly projecting spindles 14 which extend through and are adapted to rotate within suitable apertures 15 formed at spaced intervals in endless conveyer chains 16, which are positioned in parallel spaced relation to each other, one in either side of the housing 1. The chains 16 are supported at their ends and are adapted to extend around suitable sprockets 17 mounted on shafts 18 and 19 journaled respectively at the front and rear ends of the housing 1.

Mounted adjacent the outer end of the spindles 14 are small rollers 20 resting on and adapted to operate over a continuous trackway 21, the rails of which are mounted within the housing 2, adjacent each side thereof, and from the above construction it will be observed that as the endless chains are operated in the direction of the arrow—Fig. 1, in a hereinafter described manner— the conveying rolls will also travel in the same direction, and the rollers 20 resting on the trackways 21 will rotate thereover causing the same movement to be imparted to the conveying rolls 13 and the fruit carried thereby will also be rotated.

The elevator for the fruit consists of the spaced transversely disposed rollers 13, loosely mounted at the ends thereof in suitable bearings of the spaced endless chains or carriers 16. As each end of the rollers 13 carry the roller extensions or sections 20 which ride on the trackways 21 of the frame for the elevator, it is obvious that as the chains or carriers 16 work over the supporting frame or structure, independent rotation is imparted to the series of separated or spaced transversely disposed rollers constituting the bed of the elevator. Consequently, the said transversely disposed rollers are not only moved bodily along or over the supporting structure, but at the same time independently revolved on their own axes. The result of the use of such a constructed elevator when associated with a drier is that on the fruit being received onto the elevator between the spaced independently rotating rollers, the fruit is caused to continually turn over and over while being elevated, thus assuring its entire surface being exposed to the air jets. This is a feature of importance and one which will appeal to those conversant with the fruit packing industry, for the fruit should be maintained in a condition of rotation throughout while being raised or carried along by the roller elevator.

Mounted on the end of the shaft 18 is a sprocket 22 around which extends a suitable chain 23 connected to any suitable source of power, which is transmitted to the endless chains 16 which in their movement will operate the shaft 19 at one end of which is mounted a sprocket 24 which is in geared relation through an endless chain 25 with a sprocket 26 on the end of a shaft 27, rotatably mounted in journals on the rear end of the tank 6. Mounted on the shaft 27 are a plurality of worm gears 28 which intermesh with toothed gears 29 carried at the rear end of the shafts supporting the brushes 9, and from the above description it will be observed that as the conveyer is operated the rotating brushes will also be operated.

Extending transversely within the housing above the conveyer rolls 13 are a plurality of air blast pipes 30 provided in their under surface with a series of small apertures 31 through which the air is forced onto the washed fruit to dry the moisture thereon. The apertures 31 are arranged slightly facing the delivery end of the housing, so that a draft is caused within the housing to carry off the humid air therein. The air, to be projected onto the revolving fruit is supplied from a suitable air duct 32 arranged exteriorly of the housing and connected with said air blast pipes as disclosed in Figs. 1 and 3. The fruit after it has been washed and dried passes out of the delivery end of the housing off of the rolls and onto a suitable conveyer belt 33 which carries it to a sorting table or the like.

From the above described invention it will be seen that after the fruit is washed and brushed it is delivered to the conveyer rolls and as it passes under the air blasts it is constantly rotated to present all the surfaces thereof to the action of the blasts.

Canvas or other textile fabric 34 may be attached to the blast pipes 30 in any suitable manner, and extends downwardly therefrom for the full width of the conveyer. The lower portion of the fabric is adapted to contact with the fruit, absorbing the moisture from the surfaces thereof as the same is rotated, and facilitates in the rotation of the fruit by exerting retarding forces at the upper surfaces thereof.

Having thus fully described my invention what is claimed as new and desired to be protected by Letters Patent is—

1. In an apparatus for drying washed fruit, the combination with an endless traveling conveyer composed of a series of transversely disposed rollers for receiving the washed fruit to be dried, of means for imparting travel to said endless conveyer, and devices for projecting jets of air directly above the fruit contained on the said conveyer and for the full length of the rollers for the drying of the fruit as conveyed to its place of deposit.

2. In an apparatus for drying washed fruit, the combination with an endless traveling conveyer composed of a series of transversely disposed rollers for receiving the washed fruit to be dried, of means for imparting travel to said endless conveyer, means for rotating said rollers during their travel, and devices for projecting jets of air directly above the fruit contained on the said conveyer for the drying of the same as conveyed to its place of deposit.

3. An apparatus for drying washed fruit, the same comprising a conveyer for receiving the washed fruit to be dried, said conveyer comprising a pair of endless chains and means for operating the same, a plurality of pipes for projecting jets of air onto the fruit contained on the conveyer for the drying of the same, and means associated with said conveyer chains for supporting and rotating the fruit while the same is being subjected to the air blasts.

4. In a drying apparatus for washed fruit, the combination with a conveyer for receiving the washed fruit to be dried, a housing for the conveyer, said conveyer comprising a pair of endless chains and means for operating the same, means associated with and carried by said conveyer chains for supporting and rotating the fruit as it is conveyed to a place of deposit, and a plurality of pipes extending within said housing for directing an air blast downwardly onto the fruit contained on said conveyer for the drying of the same.

5. In an apparatus for drying washed fruit, the combination with a conveyer for receiving the washed fruit to be dried, said conveyer comprising a pair of endless chains and means for operating the same, a plurality of spaced conveying rolls having their ends journaled in said chains, rollers at the ends of said rolls, trackways for supporting said rollers, and a plurality of pipes for projecting jets of air downwardly onto the fruit contained on the conveyer for the drying of the same.

6. In an apparatus for drying washed fruit, the combination with a conveyer for receiving the washed fruit to be dried, a housing for the conveyer, said conveyer comprising a pair of endless conveyer chains and means for operating the same, a plurality of spaced conveying rolls having their ends rotatably mounted in said chains, rollers at the ends of said rolls, trackways for supporting said rollers, and a plurality of pipes projecting within said housing and extending over said conveying rolls for projecting jets of air downwardly onto the fruit contained on the conveyer for the drying of the same.

7. In an apparatus for drying fruit, a traveling conveyer composed of a plurality of rotatable rollers for receiving the fruit to be dried, a housing for the conveyer, means for imparting travel to said conveyer, and means for discharging air into said housing above the fruit.

8. In a fruit drier, a casing, endless traveling chains disposed in said casing, a series of rotatable rollers carried by said chains, a track for said rollers, said rollers being arranged to receive fruit, and means for delivering small streams of air directly above the fruit.

9. In an apparatus for drying fruit, a traveling conveyer composed of a plurality of rotatable rollers for receiving the fruit to be dried, a housing for the conveyer, means for discharging air into said housing above the fruit, and means within the housing for contacting with the fruit as it is conveyed for absorbing the moisture therefrom.

10. In a fruit drier, a casing, endless traveling chains disposed in said casing, a series of rotatable rollers carried by said chains, a track for said rollers, said rollers being arranged to receive fruit, means for delivering small streams of air directly above the fruit, and a fabric depending downwardly within the casing above the rollers for contacting with the fruit as it is conveyed and adapted for absorbing the moisture therefrom.

11. In a fruit drying apparatus, the combination of means for conveying fruit to be dried, means for imparting rotatable movement to the fruit during the conveying thereof and independent means to engage the fruit during the movement thereof, said means having moisture absorbing characteristics and adapted to wipe the fruit at a plurality of closely associated intervals throughout the movement thereof.

12. A fruit drying apparatus, comprising a casing, means within the casing for feeding the fruit, means for directing a jet or jets of air onto the fruit to be dried and wipers to engage the fruit, said wipers being of a character to absorb the moisture from the surfaces of the fruit.

13. In a fruit drying apparatus, the combination of a casing, means for conveying the fruit within the casing, means for directing jets of air onto the fruit to be dried and suspended strips of flexible absorbent material having portions to engage and wipe the fruit.

14. In a fruit drying apparatus, the combination of a casing, means for conveying the fruit within the casing, means for directing jets of air onto the fruit to be dried and suspended strips of flexible absorbent material having portions to engage and wipe the fruit, said strips of material being arranged at intervals throughout the length of the casing and extending substantially from side to side thereof.

15. In a fruit drier, the combination of means for supporting and conveying the fruit to be dried, said means also acting to rotate the fruit during the conveying movement, means for directing a jet or jets of air onto the fruit in its movement, and moisture absorbing wiping members to engage the fruit during its movement.

16. The combination with a fruit drier, of a traveling conveyer or elevator for the fruit consisting of a series of spaced, independently rotated, transversely disposed rollers, endless traveling carriers for imparting travel to said conveyer or elevator, and means for delivering fruit onto the conveyer or elevator during its movement of travel.

17. The combination with a fruit drier, of a traveling conveyer or elevator for the fruit consisting of a series of spaced, independently rotated, transversely disposed rollers, endless traveling carriers for imparting travel to said conveyer or elevator, means for delivering fruit onto the conveyer or elevator during its movement of travel, and devices for applying jets of air to the fruit during its movement.

18. The combination with a fruit drier, of a traveling conveyer or elevator for the fruit consisting of a series of spaced, independently rotated, transversely disposed rollers, endless traveling carriers for imparting travel to said conveyer or elevator, and means for applying jets of air to the fruit while on the conveyer and during its movement of travel.

19. In a fruit drier, the combination with a fruit conveyer on which the fruit to be dried is loosely held and consisting of a series of transversely disposed rotatable rolls, of endless carriers connecting said rolls for imparting endless longitudinal travel thereto, devices for imparting independent rotation to said rolls during the longitudinal movement thereof, means for indiscriminately delivering fruit to be dried onto the conveying member during its movement of travel, and devices for applying jets of air to the fruit freely supported on the conveyer during its movement.

20. In a fruit drier, the combination with a conveyer for the fruit to be dried, the same consisting of a series of spaced, independently rotatable rollers, means for indiscriminately delivering fruit to be dried onto the surface of said rollers, means for imparting rotation to the said rollers for propelling the fruit thereover and revolving the same on their axes, and means for applying jets of air to the surface of the fruit while on the said conveyer and during the movement of the fruit thereover.

21. In a fruit drier, the combination with a conveyer for the fruit to be dried, the same consisting of a series of spaced, independently rotatable rollers, means for indiscriminately delivering the fruit to be dried onto the surface of said rollers, means for imparting rotation to the said rollers for propelling the fruit thereover and revolving same on their axes, means for applying jets of air to the surface of the fruit while on the said conveyer and during the movement of the fruit thereover, and devices associated with said rollers for absorbing moisture from the fruit propelled thereover.

22. In a fruit drier, the combination with a conveyer for the fruit to be dried, consisting of a series of independently rotatable spaced rolls on which the fruit to be dried is freely supported and independently rotated during its travel thereover, means for feeding fruit freely onto the said rolls, devices for imparting rotation to the rollers, and means for directing drying jets of air onto the fruit during the rotation thereof over the said rollers for the removal of moisture therefrom.

In testimony whereof I have signed my name to this specification in the presence of two subscribing witnesses.

GEORGE D. PARKER.

Witnesses:
S. A. MARKS,
W. P. SHEPHERD.